United States Patent
Nishiwaki et al.

(10) Patent No.: US 6,327,238 B1
(45) Date of Patent: Dec. 4, 2001

(54) OPTICAL DISK DEVICE

(75) Inventors: Seiji Nishiwaki; Tetsuo Saimi, both of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/140,526

(22) Filed: Aug. 27, 1998

(30) Foreign Application Priority Data

Aug. 29, 1997 (JP) .................................... 9-235023

(51) Int. Cl.⁷ .................................... G02B 13/00
(52) U.S. Cl. .................... 369/112.21; 369/112.28
(58) Field of Search .................... 369/112.09, 112.14, 369/112.21, 112.28

(56) References Cited

U.S. PATENT DOCUMENTS

| | | | |
|---|---|---|---|
| 5,617,398 | * 4/1997 | Lee et al. | 369/110 |
| 5,999,509 | * 12/1999 | Sugiura et al. | 369/112 |
| 6,038,089 | * 3/2000 | Maruyama et al. | 369/112 |
| 6,084,841 | * 7/2000 | Sugiura et al. | 369/112 |

* cited by examiner

*Primary Examiner*—Aristotelis M. Psitos
(74) *Attorney, Agent, or Firm*—Merchant & Gould P.C.

(57) ABSTRACT

A beam is emitted from a radiation source such as a semiconductor laser and is converted to parallel light by a collimator lens. The light enters a surface A of a prism at an incidence angle φ (an angle between the normal line of the surface A and the incident light), thus obtaining light refracted at a refraction angle ψ (an angle between the normal line and the refracted light). This refracted light is incident on the surface B of the prism to be reflected totally from this surface, and the reflected light is incident on the surface C of the prism. Then, the reflected light enters the surface B of the prism again and is transmitted through this surface. The transmitted light is converted to convergent light by an objective lens. The convergent light is transmitted through a surface of an optical disk substrate, thus being focused on a signal surface. An optical disk device that is thin beyond the physical limitations without changing the working distance and the numerical aperture can be obtained.

2 Claims, 8 Drawing Sheets

OPTICAL DISK DEVICE

FIELD OF THE INVENTION

The present invention relates to an optical disk device used for recording or reproducing signals on or from an optical disk.

BACKGROUND OF THE INVENTION

A conventional art will be explained based on FIG. 8. FIG. 8 shows a cross-sectional configuration of an optical disk device in a conventional example. A laser beam emitted from a radiation source 1 such as a semiconductor laser is converted to parallel light 3 along the z-axis by a collimator lens 2. This parallel light 3 is incident on a reflecting surface 10A of a mirror 10 guiding light upward as reflected light 6. The reflected light 6 is converted to convergent light 8 by an objective lens 7. The convergent light 8 is transmitted through a surface 9B of an optical disk substrate 9, thus being focused on a signal surface 9A. This convergent light 8 enables signals to be recorded on the signal surface 9A or signals on a signal surface to be reproduced.

In this optical disk device, its thickness t (the distance from the lower surface 9B of the optical disk substrate to the bottom face of the mirror 10) is determined by the sum of t1+t2. The value of t1 is determined by adding the vertically movable width of the objective lens 7 to its thickness. The value of t2 is obtained by adding a margin (that is a thickness of a region that does not contribute to the reflection of the laser beam 3 at a lower part of the mirror 10 because the accuracy of the machined surface cannot be secured) to a beam diameter d before being guided upward. Considering a margin for an error in positioning the objective lens 7 (in the case where the z-axis is in the radial direction of an optical disk, also considering the maximum movable width of the objective lens 7 during tracking), the beam diameter d before being guided upward is larger than the aperture diameter of the objective lens 7. The aperture diameter is given by 2×NA×f, wherein NA and f represent a numerical aperture of the objective lens and a focal length, respectively. In DVD, the applied NA is 0.6. Since the resolution of the optical disk device is proportional to the square NA, the applied NA can not be further decreased. In order to prevent the objective lens 7 from hitting the substrate surface 9B, at least 1.3 mm of a working distance (the shortest distance between the substrate surface 9B and the objective lens surface) is required. Therefore, f is generally at least 2.4 mm in DVD. Consequently, an aperture of at least 2×NA×f=2.88 mm is required in DVD. The beam diameter d is about 3.3 mm including an adjustment margin of 0.4 mm, and the margin of the mirror 10 of 0.3 mm is added thereto, resulting in t2=3.6 mm. Furthermore, in the case of f=2.4 mm, t1 is 4.0 mm in view of its design. Thus, the thickness t of the optical disk device obtained is 7.6 mm.

In such a conventional optical disk device, there has been a problem that it is physically impossible to make the thickness t of the optical disk device less than 7.6 mm unless the working distance and the numerical aperture are changed.

SUMMARY OF THE INVENTION

Considering such a problem, an object of the present invention is to provide optical disk devices that are thin beyond the physical limitations without changing the working distance and the numerical aperture.

In order to attain the object mentioned above, the following means are used.

An optical disk device of the present invention comprises a radiation source, a collimator lens, a prism having at least three polished surfaces of A, B, and C, and an objective lens. A beam emitted from the radiation source is gathered by the collimator lens and enters the surface A of the prism to be refracted (an incidence angle $\phi$, a refraction angle $\psi$). The refracted light is incident on the surface B to be reflected and then on the surface C to be reflected. Then, the light enters the surface B again to be transmitted and is converged on an optical disk signal surface via the objective lens.

Another optical disk device of the present invention comprises a radiation source, a collimator lens, a prism having at least three polished surfaces of A, B, and C, and an objective lens. A beam emitted from the radiation source is gathered by the collimator lens and enters the surface A of the prism to be refracted (an incidence angle $\phi$, a refraction angle $\psi$). The refracted light is incident on the surface B to be reflected and then on the surface C to be reflected. Then, the light enters the surface B again to be refracted (an incidence angle $\phi'$, a refraction angle $\psi'$) and is converged on an optical disk signal surface via the objective lens.

A further optical disk device of the present invention comprises a radiation source, a collimator lens, a first prism having at least three polished surfaces of $\alpha$, $\beta$, and $\gamma$, a second prism having at least three polished surfaces of A, B, and C, and an objective lens. The first prism has the same refractive index as that of the second prism. The first prism and the second prism are joined at the surface $\gamma$ and the surface A. A beam emitted from the radiation source is gathered by the collimator lens and enters the surface $\alpha$ of the first prism to be refracted (an incidence angle $\phi$, a refraction angle $\psi$). The refracted light is incident on the surface $\beta$ to be reflected and then enters the surface $\gamma$, i.e. the surface A of the second prism to be transmitted. The transmitted light is incident on the surface B to be reflected and then on the surface C to be reflected. The light enters the surface B again to be refracted (an incidence angle $\phi''$, a refraction angle $\psi''$) and is converged on an optical disk signal surface via the objective lens.

A yet further optical disk device of the present invention comprises a radiation source, a collimator lens, a first prism having at least three polished surfaces of $\alpha$, $\beta$, and $\gamma$, a second prism having at least three polished surfaces of A, B, and C, and an objective lens. The refractive index of the first prism is different from that of the second prism. The first prism and the second prism are joined at the surface $\gamma$ and the surface A. A beam emitted from the radiation source is gathered by the collimator lens and enters the surface $\alpha$ of the first prism to be refracted (an incidence angle $\phi$, a refraction angle $\psi$). The refracted light is incident on the surface $\beta$ to be reflected and then enters the surface $\gamma$, i.e. the surface A of the second prism to be refracted (an incidence angle $\phi'$, a refraction angle $\psi'$). The light is incident on the surface B to be reflected and then on the surface C to be reflected. The light enters the surface B again to be refracted (an incidence angle $\phi''$, a refraction angle $\psi''$) and is converged on an optical disk signal surface via the objective lens.

A still further optical disk device of the present invention comprises a radiation source, a collimator lens, a first prism having at least two polished surfaces of $\alpha$ and $\beta$, a second prism having at least three polished surfaces of A, B, and C, and an objective lens. The refractive index of the first prism is different from that of the second prism. The first prism and the second prism are joined at the surface $\beta$ and the surface A. A beam emitted from the radiation source is gathered by the collimator lens and enters the surface $\alpha$ of the first prism to be refracted (an incidence angle φ, a refraction angle ψ). The refracted light is incident on the surface β, i.e. the surface A of the second prism to be refracted (an incidence angle φ', a refraction angle ψ'). The light is incident on the surface B to be reflected and then on the surface C to be reflected. The light enters the surface B again to be refracted (an incidence angle φ", a refraction angle ψ") and is converged on an optical disk signal surface via the objective lens.

According to the configurations described above, in the present invention the light refracted at the surface A of the prism or at the surface α of the first prism is guided to the objective lens by repeating the reflection within the thin prism. Consequently, the region directly under the objective lens can be made thin, thus realizing the optical disk devices that are thin beyond the physical limitations.

Furthermore, by providing the relationship that the refraction at the outgoing surface cancels the refraction at the entrance surface, the relationship that a parallel plate is located optically between the collimator lens and the objective lens can be obtained. Therefore, there is no deflection of outgoing light-ray path caused by wavelength shift. Moreover, even if light other than parallel light enters the prism, the aberration can be easily corrected, for example, by inserting an inclined parallel plate between the radiation source and the collimator lens, or by inclining the collimator lens with respect to the optical axis.

DETAILED DESCRIPTION OF THE PREFERRED EMBODIMENTS

The present invention will be explained in detail based on Embodiments shown in FIGS. 1–7 as follows.

Embodiment 1

Figure 1:
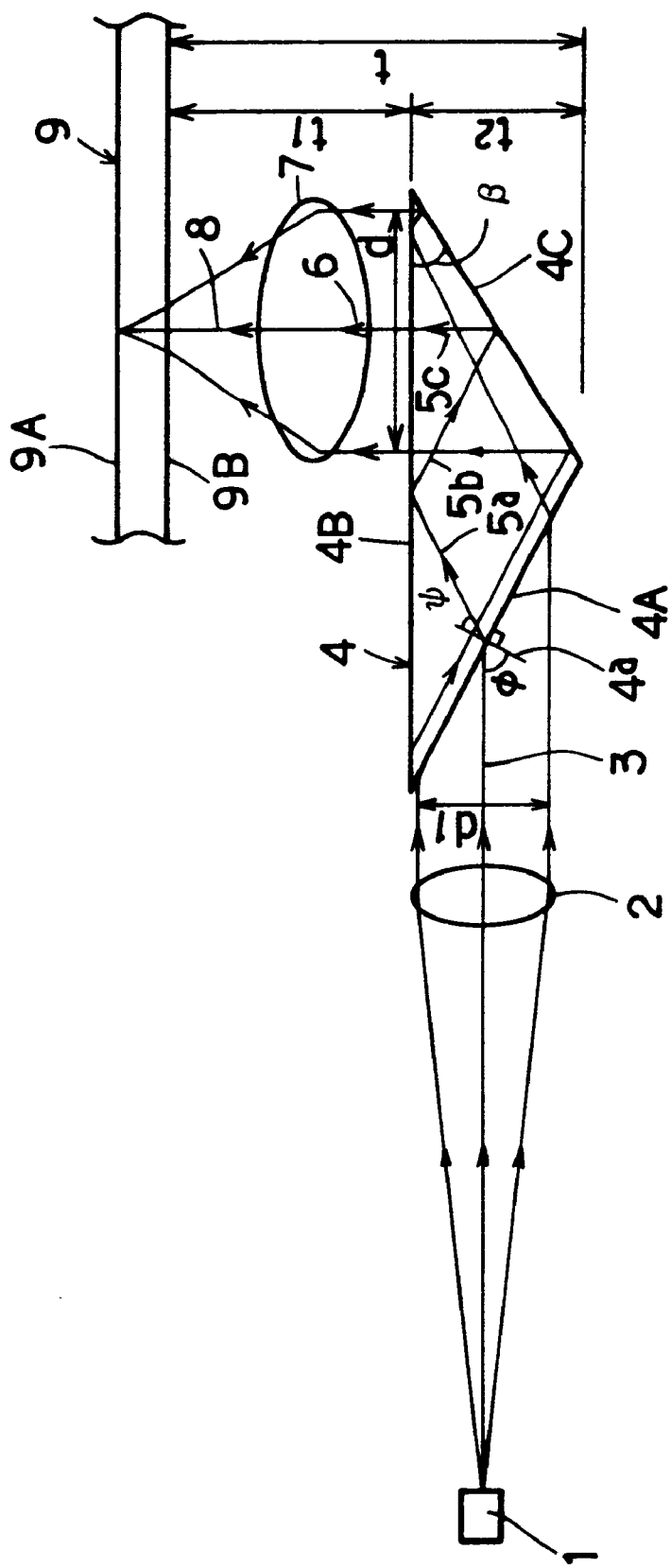
FIG. 1 is a schematic view showing the configuration of an optical disk device in Embodiment 1 of the present invention.

FIG. 1 shows the schematic configuration of an optical disk device in Embodiment 1 of the present invention. A prism 4 comprises three polished surfaces of 4A, 4B, and 4C orthogonal to the face of the paper.

In FIG. 1, a beam is emitted from a radiation source 1 such as a semiconductor laser and is converted to parallel light 3 by a collimator lens 2. The light 3 enters the surface 4A of the prism 4 formed of a glass material having a refractive index n at an incidence angle φ (an angle between the normal line 4a of the surface 4A and the incident light 3) and is refracted, thus obtaining light 5a refracted at a refraction angle ψ (an angle between the normal line 4a and the refracted light 5a). This refracted light 5a is incident on the surface 4B of the prism 4 to be reflected totally from this surface. The reflected light 5b is incident on the surface 4C of the prism 4 to be reflected. Then, the reflected light 5c reaches the surface 4B of the prism 4 again and is transmitted through this surface. The transmitted light 6 is converted to convergent light 8 by an objective lens 7. The convergent light 8 is transmitted through a surface 9B of an optical disk substrate 9, thus being focused on a signal surface 9A. This convergent light 8 enables signals to be recorded on the signal surface 9A or signals on the signal surface to be reproduced.

An example will be explained as follows, wherein the surface 4B is parallel to the light 3 and orthogonal to the light 5c, and the surface 4A is parallel to the light 5b. Since the surface 4B is parallel to the light 3, the angle between the surface 4A and the surface 4B is π/2−φ. The surface 4B is orthogonal to the light 5c, so that the angle β between the surface 4C and the surface 4B is π/4−(φ−ψ)/2. Since the surface 4A is parallel to the light 5b, the following equation:

$$\phi - \psi = \pi/2 - \phi \quad \text{(Equation 1)}$$

holds.

On the other hand, according to Snell's law at the surface 4A, the following equation:

$$\sin \phi = n \sin \psi \quad \text{(Equation 2)}$$

holds. Moreover, the beam-expansion ratio due to the refraction at the surface 4A is obtained by the following equation:

$$m = \cos \psi / \cos \phi \quad \text{(Equation 3)}.$$

In the case of n=1.5, φ is 63.3 degrees, ψ is 36.5 degrees, and β is 31.6 degrees, which are obtained from Equations 1 and 2, and m is 1.79, which is obtained from Equation 3. Consequently, the beam diameter d of the light 6 after outgoing from the prism is 1.79 times as large as the beam diameter d1 of the light 3 before entering the prism. In the case of d=3.3 mm, the beam diameter d1 is 1.84 mm. The thickness t2 of the prism 4 is 2.5 mm. The thickness t2 is obtained by adding the margin (0.3 mm) that is not actually used at the bottom of the prism to the value of (d+0.3)×tan β (the value of 0.3 is a margin that is not actually used at the upper-right end of the prism). Consequently, in the case of t1=4.0 mm, the thickness t of the optical disk device is 6.5 mm, which is greatly thinner than that of a conventional example under the same conditions by 1.1 mm.

In Embodiment 1, there are advantages not only that the light is guided to the objective lens by being raised perpendicularly through repeating the reflection within the thin prism, but also that light with an elliptic spread emitted from a semiconductor laser 1 can be reshaped into light with a nearly circular spread.

As in this embodiment, by setting the incident light 3 at the surface 4A and the transmitted light 6 at the surface 4B so as to be orthogonal with each other, even if the distance between the radiation source 1 and the prism 4 becomes longer, the thickness of the entire optical disk device including the radiation source 1 and the collimator lens 2 is not thicker than the thickness t mentioned above. Thus, a thin optical disk device can be obtained.

In this embodiment, the surfaces 4A, 4B, and 4C are orthogonal to the face of the paper, but another position relationship may be applied. In this embodiment, the surface 4B is parallel to the light 3 and orthogonal to the light 5c, and the surface 4A is parallel to the light 5b. However, the same effect can be also obtained under another condition as shown in the following embodiment.

Embodiment 2

Figure 2:
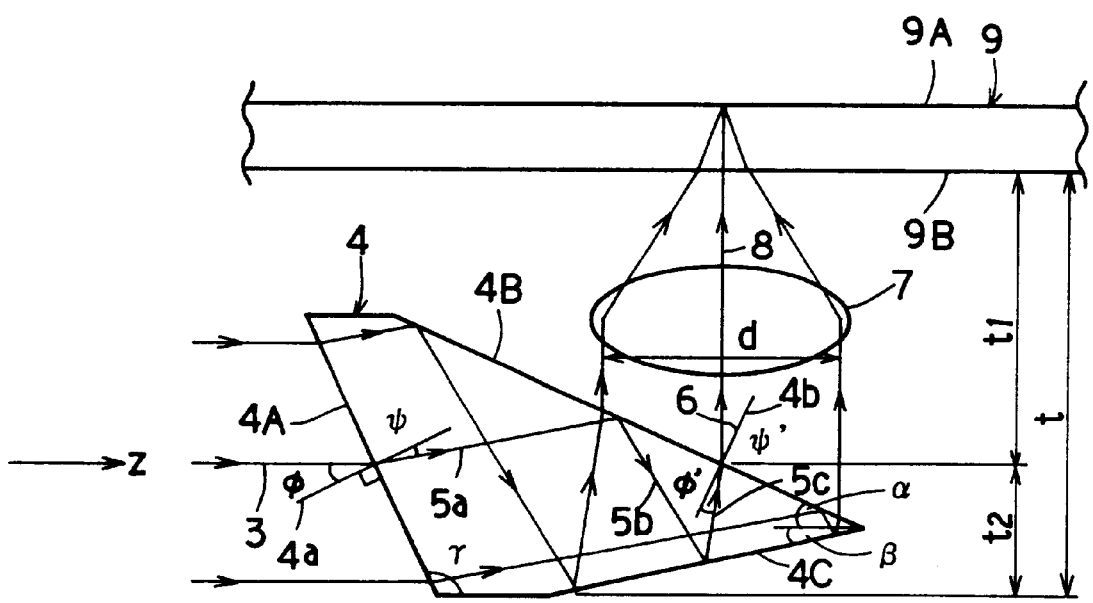
FIG. 2 is a schematic view showing the configuration of an optical disk device in Embodiment 2 of the present invention.

FIG. 2 shows the schematic configuration of an optical disk device in Embodiment 2 of the present invention. In FIG. 2, since the components such as the radiation source 1 and the collimator lens 2 are the same as in Embodiment 1, they are omitted. Basically, a prism 4 comprises three polished surfaces 4A, 4B, and 4C perpendicular to the face of the paper. The surfaces other than the three surfaces are merely cut surfaces and do not require to be polished.

A beam is emitted from the radiation source 1 such as a semiconductor laser and is converted to parallel light 3 along the z-axis on the paper by the collimator lens 2. The parallel light 3 enters the surface 4A (having an inclination angle $\gamma$ with respect to the z-axis) of the prism 4 at an incidence angle $\phi$ (an angle between the normal line 4a of the surface 4A and the incident light 3, $\phi = \gamma - \pi/2$), thus obtaining light 5a refracted at a refraction angle $\psi$ (an angle between the normal line 4a and the refracted light 5a). This refracted light 5a is incident on the surface 4B (having an inclination angle $\alpha$ with respect to the z-axis) to be reflected totally from this surface. The reflected light 5b is incident on the surface 4C (having an inclination angle $\beta$ with respect to the z-axis) to be reflected. The reflected light 5c reaches the surface 4B again at an incidence angle $\phi'$ (an angle between the normal line 4b of the surface 4B and the incident light 5c) and is transmitted through this surface, thus obtaining light 6 refracted at a refraction angle $\psi'$ (an angle between the normal line 4b and the refracted light 6). The transmitted and refracted light 6 passes through an objective lens 7, thus obtaining convergent light 8. The convergent light 8 is transmitted through a surface 9B of an optical disk substrate 9 and is focused on a signal surface 9A. This convergent light 8 enables signals to be recorded on the signal surface 9A or signals on the signal surface to be reproduced.

In the case where the refractive index of the prism is 1.5, $\alpha$ is 24 degrees, $\beta$ is 12 degrees, and $\gamma$ is 119 degrees, an equation $\psi' = \alpha$ nearly holds as a result of the calculation using the simultaneous equations of Snell's equation at each refraction surface and a reflective equation at each reflection surface. Therefore, the light 6 can be orthogonal to the light 3, i.e. orthogonal to the z-axis. In the case where the beam diameter d of the light 6 is 3.3 mm, the thickness t2 of the prism 4 directly under the objective lens is about 2.0 mm considering the 0.3-mm margin that is not actually used in the prism. Consequently, in the case of t1=4.0 mm, the thickness t of the optical disk device is 6.0 mm, which is greatly thinner than that in a conventional example under the same conditions by 1.6 mm.

Figure 8:
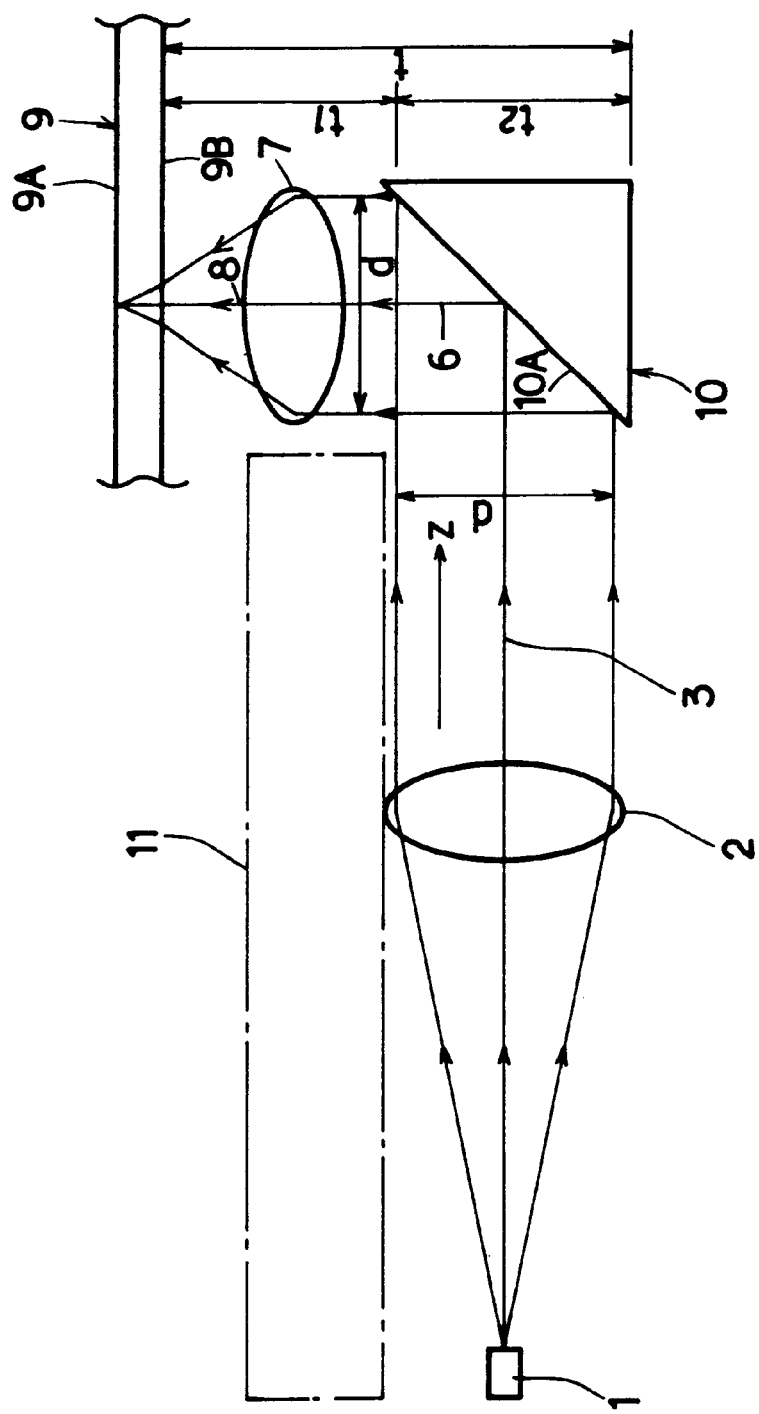
FIG. 8 is a schematic view showing the configuration of a conventional optical disk device.

Generally, the region keeping the working distance away from the surface 9B of the disk substrate can be freely used unless the region does not interfere with the objective lens 7. In a conventional example, the whole optical system is formed under the objective lens 7, and therefore the region corresponding to a region 11 in FIG. 8 is not used. However, this region can be effectively used in this embodiment.

In this embodiment, the surfaces 4A, 4B, and 4C are orthogonal to the face of the paper, but another position relationship may be applied.

As in this embodiment, by setting the incident light 3 at the surface 4A and the refracted light 6 at the surface 4B so as to be orthogonal with each other, even if the distance between the radiation source 1 and the prism 4 becomes longer, the thickness of the entire optical disk device including the radiation source 1 and the collimator lens 2 is not thicker than the thickness t mentioned above. Thus, a thin optical disk device can be obtained.

In this embodiment, there is no relationship canceling the refraction at the outgoing surface 4B and the refraction at the entrance surface 4A with each other. There is a relationship that light passes through a wedge-shaped prism. When the wavelength of the light 3 varies, the refractive index of the glass material is changed. Then the propagation direction of the refracted light 6 varies. As a result, the convergent light 8 is displaced, thus damaging the characteristics of an optical disk system that requires position control in submicron. Considering this, an example in which the propagation direction of the refracted light 6 does not vary even in the case where the wavelength varies is shown in the next Embodiment 3.

Embodiment 3

Figure 3:
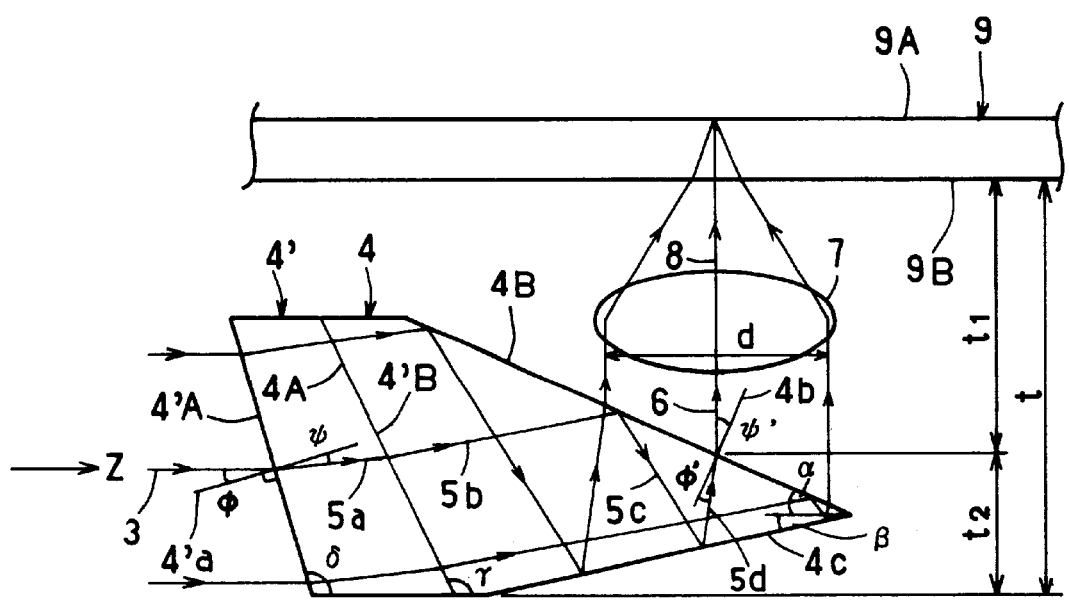
FIG. 3 is a schematic view showing the configuration of an optical disk device in Embodiment 3 of the present invention.

FIG. 3 shows the schematic configuration of an optical disk device in Embodiment 3 of the present invention. In FIG. 3, since the components such as the radiation source 1 and the collimator lens 2 are the same as in Embodiment 1, they are omitted.

In this embodiment, the configuration is the same as in Embodiment 2 except a prism is formed by joining a wedge-shaped prism 4' whose material is different from the prism 4 in Embodiment 2 described above to the surface 4A of the prism 4.

Basically, the prism 4' comprises two polished surfaces 4'A and 4'B (the surface 4'B is joined to the surface 4A of the prism 4) perpendicular to the face of the paper. The surfaces other than the two surfaces are merely cut surfaces and do not require to be polished.

A beam is emitted from the radiation source 1 such as a semiconductor laser and is converted to parallel light 3 along the z-axis on the paper by the collimator lens 2. The parallel light 3 enters the surface 4'A (having an inclination angle $\delta$ with respect to the z-axis) of the prism 4' at an incidence angle $\phi$ (an angle between the normal line 4'a of the surface 4'A and the incident light 3, $\phi = \delta - \pi/2$), thus obtaining light 5a refracted at a refraction angle $\psi$ (an angle between the normal line 4'a and the refracted light 5a). This refracted light 5a reaches the surface 4A (having an inclination angle $\gamma$ with respect to the z-axis) of the prism 4 and is refracted. The refracted light 5b is incident on the surface 4B (having an inclination angle $\alpha$ with respect to the z-axis) to be reflected totally from this surface. The reflected light 5c is incident on the surface 4C (having an inclination angle $\beta$ with respect to the z-axis) to be reflected. The reflected light 5d reaches the surface 4B again at an incidence angle $\phi'$ (an angle between the normal line 4b of the surface 4B and the incident light 5d) and is transmitted through this surface, thus obtaining light 6 refracted at a refraction angle $\psi'$ (an angle between the normal line 4b and the refracted light 6). The transmitted and refracted light 6 passes through an objective lens 7, thus obtaining convergent light 8. The convergent light 8 is transmitted through a surface 9B of an optical disk substrate 9 and is focused on a signal surface 9A. This convergent light 8 enables signals to be recorded on the signal surface 9A or signals on the signal surface to be reproduced.

In the case where the refractive index of the prism 4 is 1.5, $\alpha$ is 15 degrees, $\beta$ is 23 degrees, $\gamma$ is 130 degrees, the refractive index of the prism 4' is 1.6, $\delta$ is 120 degrees, and the ratio of the refractive index dispersion of the prism 4' to the refractive index dispersion of the prism 4 is 2.1, the change in refraction angle at the surfaces 4'A and 4B caused by the wavelength change is almost canceled by the change in refraction angle at the surface 4A. Thus, the propagation direction of the refracted light 6 hardly varies as a whole. Furthermore, since this embodiment has almost the same configuration as in Embodiment 2, the effect for realizing a device with a thinner thickness, which is a characteristic of Embodiment 2, also is not damaged.

Embodiment 2 can be applied only in the case where the light 3 is a parallel light. Similarly, Embodiment 3 with the above-mentioned conditions can be applied only in the case where the light 3 is a parallel light. That is, there is no relationship canceling the refraction at the outgoing surface 4B and the refraction at the entrance surface 4A (Embodiment 2) or 4'A (Embodiment 3 with the above-mentioned conditions) with each other. There is a relationship that light is transmitted through a wedge-shaped prism. Therefore, in the case where the light 3 is light of a finite system (divergence or convergence), great astigmatism occurs. Considering this, an example in which aberration can be prevented even in the case of using finite system is shown in the next Embodiment 4.

Embodiment 4

Figure 4:
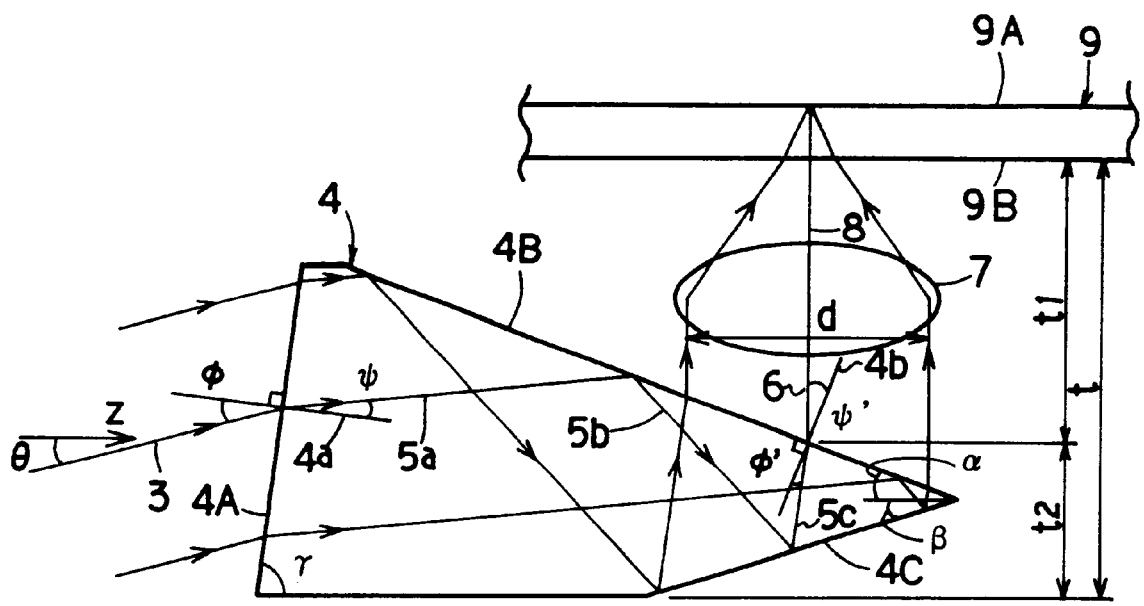
FIG. 4 is a schematic view showing the configuration of an optical disk device in Embodiment 4 of the present invention.

FIG. 4 shows the schematic configuration of an optical disk device in Embodiment 4 of the present invention. In FIG. 4, since the components such as the radiation source 1 and the collimator lens 2 are the same as in Embodiment 1, they are omitted. Basically, a prism 4 comprises three polished surfaces 4A, 4B, and 4C perpendicular to the face of the paper. The surfaces other than the three surfaces are merely cut surfaces and do not require to be polished.

A beam is emitted from the radiation source 1 such as a semiconductor laser and is converted to parallel light 3 having an angle $\theta$ with respect to the z-axis by the collimator lens 2. The light 3 enters the surface 4A (having an inclination angle $\gamma$ with respect to the z-axis) of the prism 4 at an incidence angle $\phi$ (an angle between the normal line 4a of the surface 4A and the incident light 3), thus obtaining light 5a refracted at a refraction angle $\psi$ (an angle between the normal line 4a and the refracted light 5a). This refracted light 5a is incident on the surface 4B (having an inclination angle $\alpha$ with respect to the z-axis) of the prism 4 to be reflected totally from this surface. The reflected light 5b is incident on the surface 4C (having an inclination angle $\beta$ with respect to the z-axis) of the prism 4 to be reflected. The reflected light 5c enters the surface 4B of the prism 4 again at an incidence angle $\phi'$ (an angle between the normal line 4b of the surface 4B and the incident light 5c) and is transmitted through this surface, thus obtaining light 6 refracted at a refraction angle $\psi'$ (an angle between the normal line 4b and the refracted light 6). The transmitted and refracted light 6 passes through an objective lens 7, thus obtaining convergent light 8. The convergent light 8 is transmitted through a surface 9B of an optical disk substrate 9 and is focused on a signal surface 9A. This convergent light 8 enables signals to be recorded on the signal surface 9A or signals on the signal surface to be reproduced.

In the case where the refractive index of the prism is 1.5, $\theta$ is 14 degrees, $\alpha$ is 21 degrees, $\beta$ is 18 degrees, and $\gamma$ is 83 degrees, an equation, $\psi'=\alpha$, nearly holds as a result of the calculation using the simultaneous equations of Snell's equation at each refraction surface and a reflective equation of each reflection surface. Therefore, the light 6 can be orthogonal to the z-axis. In the case where the beam diameter d of the light 6 is 3.3 mm, the thickness t2 of the prism 4 directly under the objective lens is about 2.2 mm considering a 0.3-mm margin that is not actually used in the prism. Consequently, in the case of t1=4.0 mm, the thickness t of the optical disk device is 6.2 mm, which is greatly thinner than that in a conventional example under the same conditions by 1.4 mm.

Moreover, the relationships $\phi=\psi'$ and $\phi'=\psi$ also hold with an error range of $|\cos\psi\cos\psi'-\cos\phi\cos\phi'|<0.1$. The refraction at the entrance surface 4A is in the clockwise direction within the refraction surface, and the refraction at the outgoing surface 4B is in the counterclockwise direction. That is, in the case where the number of the refraction within the prism is even, the unconformity in the refraction direction satisfies the condition for canceling the refracting power. Therefore, the refraction at the entrance surface 4A and the refraction at the outgoing surface 4B are canceled with each other, that is, the relationship that light is transmitted through a parallel plane exists (hereafter referred to as "a relationship of a parallel plane"). Consequently, even if the light 3 is of a finite system (divergence or convergence), only small aberration occurs.

In this embodiment, the surfaces 4A, 4B, and 4C are orthogonal to the face of the paper. However, another location relationship may be applied when the refraction surfaces (including both an incidence light and a refracted light) at the surfaces 4A and 4B are parallel.

In this embodiment, in order to include the radiation source 1 and the collimator lens 2 within the thickness t of 6.2 mm, $\theta$ should be small, if possible, zero. However, when $\theta$ is 10 degrees or less, the conditions that the thickness is thin and the relationship of a parallel plate is satisfied are incompatible. Considering this, an example in which $\theta$ can be set to zero while satisfying the conditions that the thickness is thin and the relationship of a parallel plate exists is shown in the next Embodiment 5.

Embodiment 5

Figure 5:
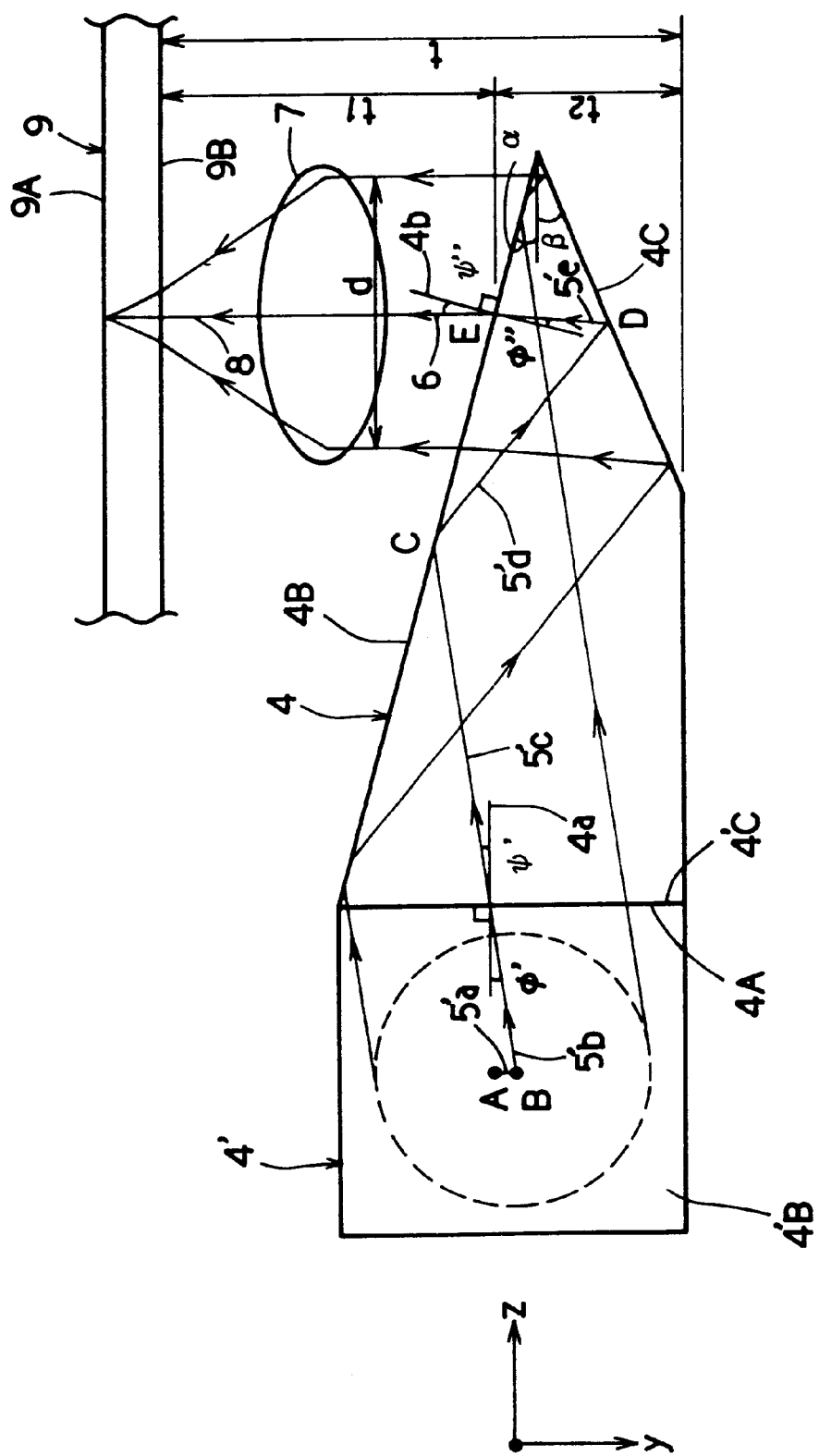
FIG. 5 is a front view showing the schematic configuration of an optical disk device in Embodiment 5 of the present invention.
Figure 6:
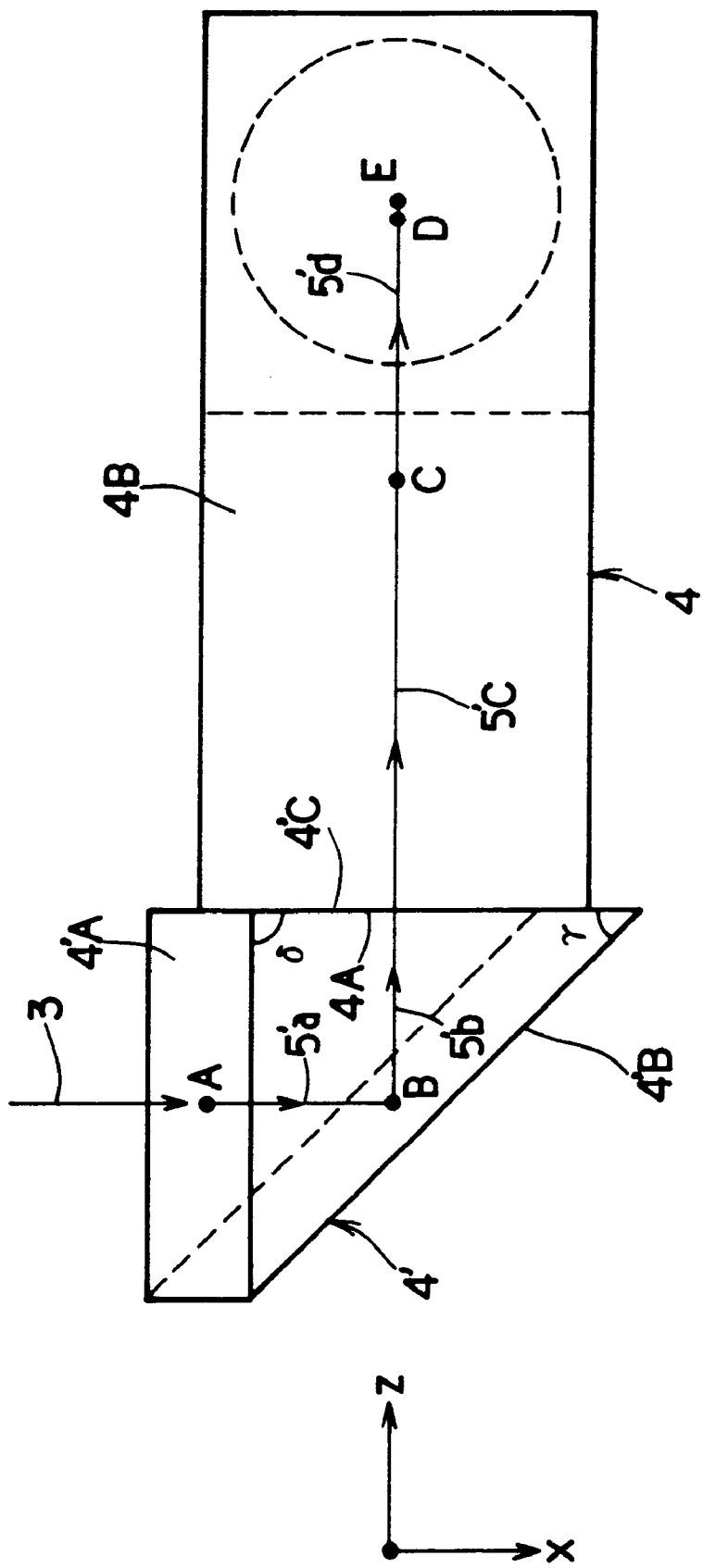
FIG. 6 is a plan view showing the schematic configuration of the optical disk device in Embodiment 5 of the present invention.
Figure 7:
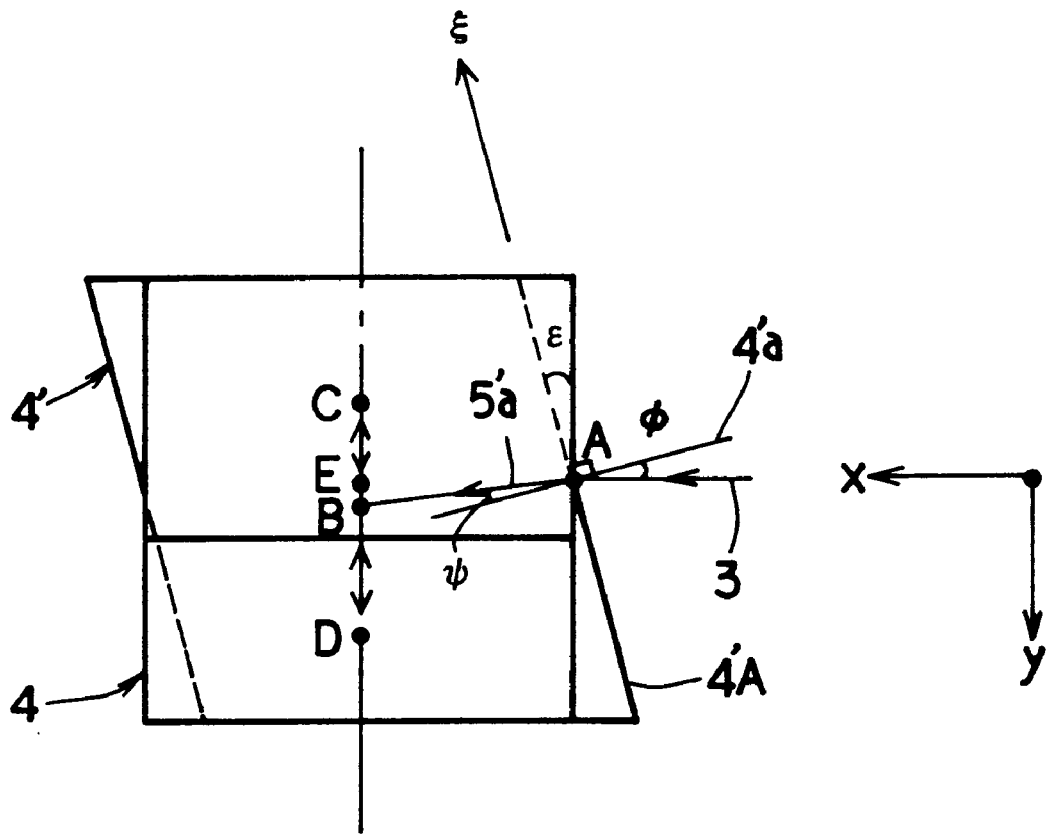
FIG. 7 is a side view showing the schematic configuration of the optical disk device in Embodiment 5 of the present invention.

FIG. 5 is a front view of an optical disk device in Embodiment 5 of the present invention. FIG. 6 is its plan view (an objective lens 7 and an optical disk substrate 9 are omitted) and FIG. 7 is its side view (the objective lens 7 and the optical disk substrate 9 are omitted). In FIGS. 5–7, since the components such as the radiation source 1 and the collimator lens 2 are the same as in Embodiment 1, they are omitted.

Basically, a prism 4 comprises three polished surfaces 4A, 4B, and 4C orthogonal to the y-z surface. The surfaces other than the three surfaces are merely cut surfaces and do not require to be polished. A prism 4' comprises three polished surfaces 4'A, 4'B, and 4'C parallel to the $\epsilon$-axis (having an angle $\epsilon$ with respect to the y-axis and being on the x-y surface) in FIG. 7. The surfaces other than the three surfaces are merely cut surfaces and do not require to be polished. The prism 4' and the prism 4 are joined at the surface 4'C and the surface 4A using UV resins or the like.

A beam is emitted from the radiation source 1 such as a semiconductor laser and is converted to parallel light 3 along the x-axis (the y-axis and the z-axis are defined based on the x-axis as an orthogonal coordinate axis) by the collimator lens 2. The parallel light 3 enters the surface 4'A (having an inclination angle $\epsilon$ with respect to the y-axis in FIG. 7 and an inclination angle $\delta$ with respect to the x-axis in FIG. 6) of the prism 4' at an incidence angle $\phi$ (an angle between the normal line 4'a of the surface 4'A and the incident light 3), thus obtaining light 5'a refracted at a refraction angle $\psi$ (an angle between the normal line 4'a and the refracted light 5'a). This refracted light 5'a is incident on the surface 4'B (having an inclination angle $\gamma$ with respect to the x-axis in FIG. 6) to be reflected totally from this surface. The reflected light 5'b enters the surface 4'C, i.e. the surface 4A (orthogonal to the z-axis) of the prism 4 at an incidence angle $\phi'$ (an angle between the normal line 4a of the surface 4A and the incident light 5'b), thus obtaining light 5'c refracted at a refraction angle $\psi'$ (an angle between the normal line 4a and the refracted light 5'c) (when the prisms 4 and 4' are formed of the same glass material, the light is transmitted straight without being refracted). This refracted light 5'c is incident on the surface 4B (having an inclination angle $\alpha$ with respect to the z-axis) to be reflected totally from this surface. The reflected light 5'd is incident on the surface 4C (having an inclination angle $\beta$ with respect to the z-axis) to be reflected. The reflected light 5'e enters the surface 4B again at an incidence angle $\phi''$ (an angle between the normal line 4b of the surface 4B and the incident light 5'e) and is transmitted through this surface, thus obtaining light 6 refracted at a refraction angle $\psi''$ (an angle between the normal line 4b and the refracted light 6). The transmitted and refracted light 6 passes through an objective lens 7, thus obtaining convergent light 8. The convergent light 8 is transmitted through a surface 9B of an optical disk substrate 9 and is focused on a signal surface 9A. This convergent light 8 enables signals to be recorded on the signal surface 9A or signals on the signal surface to be reproduced.

In the case where each refractive index of the two prisms is 1.5, $\alpha$ is 14.6 degrees, $\beta$ is 23 degrees, $\gamma$ is 45.1 degrees, $\delta$ is 90 degrees, and $\epsilon$ is 14.6 degrees, an equation, $\psi''=\alpha$, nearly holds as a result of the calculation using the simultaneous equations of Snell's equation at each refraction surface and a reflective equation at each reflection surface. Therefore, the light 6 can be orthogonal to the x-z surface. In the case where the beam diameter d of the light 6 is 3.3 mm, the thickness t2 of the prism 4 directly under the objective lens is about 2.2 mm considering a 0.3-mm margin that is not actually used in the prism. Consequently, in the case of t1=4.0 mm, the thickness t of the optical disk device is 6.2 mm, which is greatly thinner than that in a conventional example under the same conditions by 1.4 mm.

Moreover, the relationships $\phi=\psi''$ and $\phi''=\psi$ also hold with an error range of $|\cos \psi \cos \psi''-\cos \phi \cos \phi''|<0.1$. The refraction at the entrance surface 4'A is in the counterclockwise direction within the refraction surface, and the refraction at the outgoing surface 4B is in the counterclockwise direction. That is, in the case where the number of the reflection within the prism is odd, the condition for canceling the refracting power is the conformity in the refraction directions. Therefore, the refraction at the entrance surface 4'A and the refraction at the outgoing surface 4B are canceled with each other, that is, the relationship that light is transmitted through a parallel plane exists. Consequently, even if the light 3 is of a finite system (divergence or convergence), only small aberration occurs.

Moreover, in the embodiment mentioned above, the incident-light axis is within the surface orthogonal to the outgoing light 6, and therefore the whole thickness including the radiation source 1 and the collimator lens 2 can be made thinner.

Though there is a disadvantage in using two prisms, the polished surfaces of each prism are parallel to a specific axis (the x-axis in the prism 4 and the $\epsilon$-axis shown in FIG. 7 in the prism 4') and therefore by polishing three surfaces of a rod glass material and cutting it off (at a right angle for the prism 4 and at an angle of $\pi/2-\epsilon$ for the prism 4') multiple prisms can be obtained, thus restraining the processing cost to a low level.

In this embodiment, the surface 4'C and the surface 4A are orthogonal to the z-axis, the surfaces 4A, 4B, and 4C are orthogonal to the face of the paper, and the surfaces 4'A, 4'B, and 4'C are parallel to the $\epsilon$-axis. However, when the refraction surfaces (a surface including the incident-light axis and the refracted-light axis) at the surfaces 4A and 4B are parallel and the symmetry plane of the refraction surface at the surface 4'A with respect to the surface 4'B is parallel to the refraction surface at the surface 4B, another location relationship may be applied. Furthermore, in this embodiment, the light 3 is along the x-axis, but the same effect can be obtained even if changing its direction.

In this embodiment, the two prisms have the same refractive index. However, each of the two prisms may be formed of a glass material with a different refractive index. In this case, the conditions of the parallel plate $\phi=\psi''$ and $\phi''=\psi$ are changed to $\cos \psi \cos \psi' \cos \psi''=\cos \phi \cos \phi' \cos \phi''$ and the error precision of the changed condition satisfies $|\cos \psi \cos \psi' \cos \psi''-\cos \phi \cos \phi' \cos \phi''|<0.1$.

The prism is not always necessary to be a triangular prism such as the prism 4'. As shown in Embodiment 3, when joining a wedge prism with two polished surfaces to the prism 4 (the whole prism shape after being joined is equivalent to that in FIG. 2–FIG. 4), the refraction at the joined surface of the wedge prism is added. Therefore, the incident-light axis and the outgoing-light axis can be also set so as to have the orthogonal relationship while keeping the relationship of a parallel plate. In this case, the conditions of the parallel plate $\phi=\psi''$ and $\phi=\psi$ also are changed to $\cos \psi \cos \psi' \cos \psi''=\cos \phi \cos \phi' \cos \phi''$ and the error precision of the changed condition satisfies $|\cos \psi \cos \psi' \cos \psi''-\cos \phi \cos \phi' \cos \phi''|<0.1$.

When the condition of the parallel plate is not satisfied, generally the optical axis is inclined due to the influence of the refractive index dispersion caused by the change in wavelength of the light source. However, in the manner that the prism 4' or a wedge prism is joined to the prism 4, the influence of the refractive index dispersion can be canceled by suitably combining them using a different glass material for each prism.

When locating a parallel plate in a finite light, generally spherical aberration occurs when locating the parallel plate so as to be perpendicular to the optical axis and astigmatism occurs when inclining the parallel plate. Therefore, in Embodiments 4 and 5, each prism has the relationship of a parallel plate, but the light does not enter the prism perpendicularly, thus generating astigmatism. However, this sort of aberration can be corrected. For example, by inclining the collimator lens 2 with respect to the optical axis or by locating the parallel plate with inclination between the radiation source 1 and the collimator lens 2, most aberration can be eliminated.

In Embodiments 1–5, the reflection on the surface 4B is total reflection, and the reflection on the surface 4'B also is total reflection in Embodiment 5. However, the reflection on the surface 4C is not total reflection, so that it is necessary to form a reflective layer in order to improve the reflectivity. In the case where the light entering the prism is a circularly polarized light, in order to keep the circularly polarized light after passing through the prism, it is necessary to correct the phase difference between P-wave and S-wave generated by the total reflection through the reflection on the surface 4C. Generally, this correction of the phase difference can be attained by using a dielectric multilayer as a reflective layer.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. An optical disk device, comprising:
   a radiation source;
   a collimator lens;
   a prism having at least three polished surfaces of A, B, and C; and
   an objective lens;
   wherein a beam emitted from the radiation source is gathered by the collimator lens, enters the surface A of the prism to be refracted (an incidence angle $\phi$, a refraction angle $\psi$), is incident on the surface B to be reflected and then on the surface C to be reflected, enters the surface B again to be refracted (an incidence angle $\phi'$, a refraction angle $\psi'$) and is converged on an optical disk signal surface via the objective lens.

2. The optical disk device according to claim 1, wherein the incident-light axis at the surface A and the refracted-light axis at the surface B are orthogonal to each other.

* * * * *